United States Patent
Viering et al.

(10) Patent No.: US 12,395,225 B2
(45) Date of Patent: Aug. 19, 2025

(54) METHOD FOR UTILIZING BEAM-SPECIFIC CELL-INDIVIDUAL OFFSETS IN A USER EQUIPMENT

(71) Applicant: Nokia Technologies Oy, Espoo (FI)

(72) Inventors: Ingo Viering, Munich (DE); Andreas Lobinger, Grafing (DE); Ahmad Awada, Munich (DE); Henrik Martikainen, Jyvaskyla (FI); Umur Karabulut, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 396 days.

(21) Appl. No.: 17/912,957

(22) PCT Filed: Mar. 31, 2020

(86) PCT No.: PCT/EP2020/059180
§ 371 (c)(1),
(2) Date: Sep. 20, 2022

(87) PCT Pub. No.: WO2021/197591
PCT Pub. Date: Oct. 7, 2021

(65) Prior Publication Data
US 2023/0208496 A1 Jun. 29, 2023

(51) Int. Cl.
*H04B 7/06* (2006.01)
*H04W 36/00* (2009.01)
*H04W 36/08* (2009.01)

(52) U.S. Cl.
CPC .... *H04B 7/0695* (2013.01); *H04W 36/00835* (2018.08); *H04W 36/00837* (2018.08); *H04W 36/085* (2023.05)

(58) Field of Classification Search
CPC ............... H04B 7/0695; H04B 7/0617; H04W 36/00835; H04W 36/00837; H04W 36/085
See application file for complete search history.

(56) References Cited

U.S. PATENT DOCUMENTS

| | | | |
|---|---|---|---|
| 9,668,189 B2 | 5/2017 | Wang et al. | |
| 2016/0150435 A1 | 5/2016 | Baek et al. | |

(Continued)

FOREIGN PATENT DOCUMENTS

| | | | | |
|---|---|---|---|---|
| EP | 3451553 A2 * | 3/2019 | ........... | H04B 7/0617 |
| WO | 2018143702 A1 | 8/2018 | | |

(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300 V16.0.0, Dec. 2019, pp. 1-101.

(Continued)

*Primary Examiner* — Sujoy K Kundu
*Assistant Examiner* — Vladislav Y Agureyev
(74) *Attorney, Agent, or Firm* — Lippes Mathias LLP

(57) ABSTRACT

In one aspect of the present disclosure, a user equipment has a processor and a memory including computer program code, where the memory and the computer program code are configured, with the processor, to cause the user equipment to receive from a network node at least one beam-specific mobility parameter associated with at least one respective candidate beam in a serving cell; to switch in the serving cell to a new beam among the at least one candidate beam; and to select a beam-specific mobility parameter associated with the new beam. In another aspect of the present disclosure, a network node has a processor and a memory including (Continued)

computer program code, where the memory and the computer program code are configured, with the processor, to cause the network node to preconfigure at least one beam-specific mobility parameter associated with at least one respective candidate beam in a serving cell; and to send the at least one beam-specific mobility parameter to a user equipment.

5 Claims, 5 Drawing Sheets

(56) References Cited

U.S. PATENT DOCUMENTS

| | | | |
|---|---|---|---|
| 2017/0127321 A1* | 5/2017 | Wang | H04W 36/00837 |
| 2017/0324459 A1 | 11/2017 | Koskela et al. | |
| 2018/0124766 A1 | 5/2018 | Nagaraja et al. | |
| 2019/0081688 A1* | 3/2019 | Deenoo | H04B 7/088 |
| 2019/0089579 A1* | 3/2019 | Sang | H04W 36/305 |
| 2019/0132778 A1* | 5/2019 | Park | H04W 24/10 |
| 2019/0215048 A1* | 7/2019 | Cirik | H04W 74/0833 |
| 2019/0268782 A1* | 8/2019 | Martin | H04W 24/10 |
| 2019/0387440 A1* | 12/2019 | Yiu | H04W 36/0072 |
| 2020/0028745 A1* | 1/2020 | Parkvall | H04W 52/028 |
| 2020/0068462 A1 | 2/2020 | Zetterberg et al. | |
| 2020/0100311 A1* | 3/2020 | Cirik | H04B 7/0695 |
| 2020/0120526 A1* | 4/2020 | Da Silva | H04W 56/001 |
| 2020/0154327 A1* | 5/2020 | Koskela | H04B 7/0695 |
| 2020/0178130 A1* | 6/2020 | Pakniat | H04W 36/0094 |
| 2020/0413303 A1* | 12/2020 | Ökvist | H04W 36/04 |
| 2021/0352654 A1* | 11/2021 | Ai | H04W 72/51 |
| 2022/0116802 A1* | 4/2022 | Kim | H04W 76/27 |
| 2022/0116839 A1* | 4/2022 | Tseng | H04W 36/0058 |
| 2022/0191753 A1* | 6/2022 | Hwang | H04W 36/302 |

FOREIGN PATENT DOCUMENTS

| | | | |
|---|---|---|---|
| WO | WO-2018202310 A1 * | 11/2018 | |
| WO | 2018231115 A1 | 12/2018 | |
| WO | 2019032025 A1 | 2/2019 | |
| WO | 2019170210 A1 | 9/2019 | |

OTHER PUBLICATIONS

"3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

"3rd Generation Partnership Project; Technical Specification Group Radio Access Network; NR; Medium Access Control (MAC) protocol specification (Release 15)", 3GPP TS 38.321 V15.8.0, Dec. 2019, pp. 1-78.

Oh et al., "An Efficient Handover Scheme for Providing the Inter-Beam Mobility", International Conference on Information and Communication Technology Convergence (ICTC), Oct. 22-24, 2014, pp. 695-696.

Office action received for corresponding European Patent Application No. 20717591.0, dated Apr. 1, 2025, 6 pages.

* cited by examiner

METHOD FOR UTILIZING BEAM-SPECIFIC CELL-INDIVIDUAL OFFSETS IN A USER EQUIPMENT

CROSS REFERENCE TO RELATED APPLICATION

This patent application is a U.S. National Stage application of International Patent Application Number PCT/EP2020/059180 filed Mar. 31, 2020, which is hereby incorporated by reference in its entirety.

TECHNICAL FIELD

This disclosure relates to mobility in a cellular and mobile communications network. More specifically, this disclosure relates to mobility robustness optimization (MRO) for beamformed transmission.

BACKGROUND

Mobility robustness optimization (MRO) is a well-known method for optimizing mobility parameters in order to minimize failures, unnecessary handovers, and the like.

In the present disclosure, a more efficient signaling method, which allows the UE to use beam-specific mobility parameters, is proposed.

SUMMARY

In a first aspect of the present disclosure, an apparatus comprises: at least one processor; and at least one memory including computer program code, the at least one memory and the computer program code being configured, with the at least one processor, to cause the apparatus to perform the following: receive from a network node at least one beam-specific mobility parameter associated with at least one respective candidate beam in a serving cell; switch in the serving cell to a new beam among the at least one candidate beam; and select a beam-specific mobility parameter associated with the new beam.

In a second aspect of the present disclosure, a method comprises: receiving from a network node at least one beam-specific mobility parameter associated with at least one respective candidate beam in a serving cell; switching in the serving cell to a new beam among the at least one candidate beam; and selecting a beam-specific mobility parameter associated with the new beam.

In a third aspect of the present disclosure, an apparatus comprises: means for receiving from a network node at least one beam-specific mobility parameter associated with at least one respective candidate beam in a serving cell; means for switching in the serving cell to a new beam among the at least one candidate beam; and means for selecting a beam-specific mobility parameter associated with the new beam.

In a fourth aspect of the present disclosure, an apparatus comprises: circuitry configured to receive from a network node at least one beam-specific mobility parameter associated with at least one respective candidate beam in a serving cell; circuitry configured to switch in the serving cell to a new beam among the at least one candidate beam; and circuitry configured to select a beam-specific mobility parameter associated with the new beam.

In a fifth aspect of the present disclosure, a computer program product comprises a non-transitory computer-readable storage medium bearing computer program code embodied therein for use with a computer, the computer program code comprising code for performing: receiving from a network node at least one beam-specific mobility parameter associated with at least one respective candidate beam in a serving cell; switching in the serving cell to a new beam from the at least one candidate beam; and selecting a beam-specific mobility parameter associated with the new beam.

In a sixth aspect of the present disclosure, an apparatus comprises: at least one processor; and at least one memory including computer program code, the at least one memory and the computer program code being configured, with the at least one processor, to cause the apparatus to perform the following: preconfigure at least one beam-specific mobility parameter associated with at least one respective candidate beam in a serving cell; and send the at least one beam-specific mobility parameter to a user equipment, whereby the user equipment selects the beam-specific mobility parameter corresponding to one of: the beam that beam management instructs for use; and the beam autonomously chosen for use by the user equipment for recovery when performing beam failure recovery.

In a seventh aspect of the present disclosure, a method comprises: preconfiguring at least one beam-specific mobility parameter associated with at least one respective candidate beam in a serving cell; and sending the at least one beam-specific mobility parameter to a user equipment, whereby the user equipment selects the beam-specific mobility parameter corresponding to one of: the beam that beam management instructs for use; and the beam autonomously chosen for use by the user equipment for recovery when performing beam failure recovery.

In an eighth aspect of the present disclosure, an apparatus comprises: means for preconfiguring at least one beam-specific mobility parameter associated with at least one respective candidate beam in a serving cell; and means for sending the at least one beam-specific mobility parameter to a user equipment, whereby the user equipment selects the beam-specific mobility parameter corresponding to one of: the beam that beam management instructs for use; and the beam autonomously chosen for use by the user equipment for recovery when performing beam failure recovery.

In a ninth aspect of the present disclosure, an apparatus comprises: circuitry configured to preconfigure at least one beam-specific mobility parameter associated with at least one respective candidate beam in a serving cell; and circuitry configured to send the at least one beam-specific mobility parameter to a user equipment, whereby the user equipment selects the beam-specific mobility parameter corresponding to one of: the beam that beam management instructs for use; and the beam autonomously chosen for use by the user equipment for recovery when performing beam failure recovery.

In a tenth aspect of the present disclosure, a computer program product comprises a non-transitory computer-readable storage medium bearing computer program code embodied therein for use with a computer, the computer program code comprising code for performing: preconfiguring at least one beam-specific mobility parameter associated with at least one respective candidate beam in a serving cell; and sending the at least one beam-specific mobility parameter to a user equipment, whereby the user equipment selects the beam-specific mobility parameter corresponding to one of: the beam that beam management instructs for use; and the beam autonomously chosen for use by the user equipment for recovery when performing beam failure recovery.

BRIEF DESCRIPTION OF THE DRAWINGS

The foregoing and other aspects of these teachings are made more evident in the following detailed description, when read in conjunction with the attached drawing figures.

DETAILED DESCRIPTION

Figure 1:
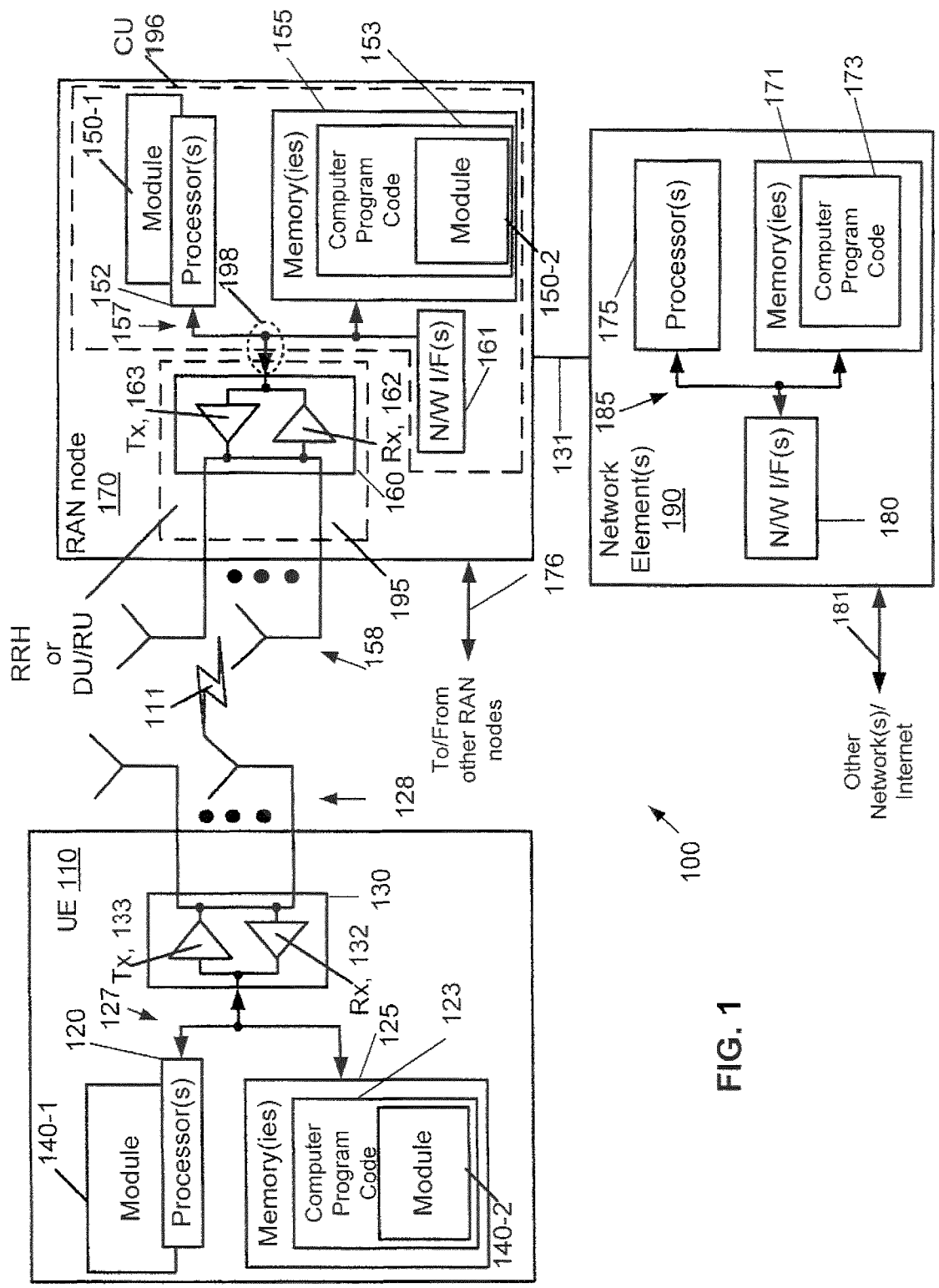
FIG. 1 shows a simplified block diagram of certain apparatus in which the subject matter of the present disclosure may be practiced.

FIG. 1 is a block diagram of one possible and non-limiting example in which the subject matter of the present disclosure may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device, such as a mobile device, that can access the wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with RAN node 170 via a wireless link 111.

The RAN node 170 in this example is a base station that provides access to wireless devices, such as the UE 110. The RAN node 170 may be, for example, a base station for 5G, also called New Radio (NR). In 5G, the RAN node 170 may be an NG-RAN node, which is defined as either a gNB or an ng-eNB. A gNB is a node providing NR user plane and control-plane protocol terminations toward the UE, and connected via the NG interface to a 5GC, such as, for example, the network element(s) 190. The ng-eNB is a node providing E-UTRA user plane and control plane protocol terminations towards the UE, and connected via the NG interface to the 5GC. In one of several approaches, the NG-RAN node may include multiple network elements, which may also include a centralized unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or ng-eNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The preceding paragraph describes one way of splitting the gNB functions: other splits are possible as well with different distributions of [LOW-PHY/HIGH-PHY/PHY] MAC/RLC/PDCP[/SDAP]/RRC functions across the various network nodes and different interfaces (e.g., CPRI/eCPRI/F1).

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, module 150 may be implemented as module 150-2, which is implemented as computer program code 153 executed by the one or more processors 152. For instance, the one or more memories 155 and the computer program code 153 are configured, with the one or more processors 152, to cause the RAN node 170 to perform one or more of the operations as described herein. Note that the functionality of the module 150 may be distributed, such as being distributed between the DU 195 and the CU 196, or be implemented solely in the CU 196.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a centralized unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360° area so that the single base station's coverage area covers an approximate oval or circle. Furthermore, each cell can correspond to a single carrier and a base station may use multiple carriers. So, if there are three 120° cells per carrier and two carriers, then the base station has a total of six cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured, with the one or more processors 175, to cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer-readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer-readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
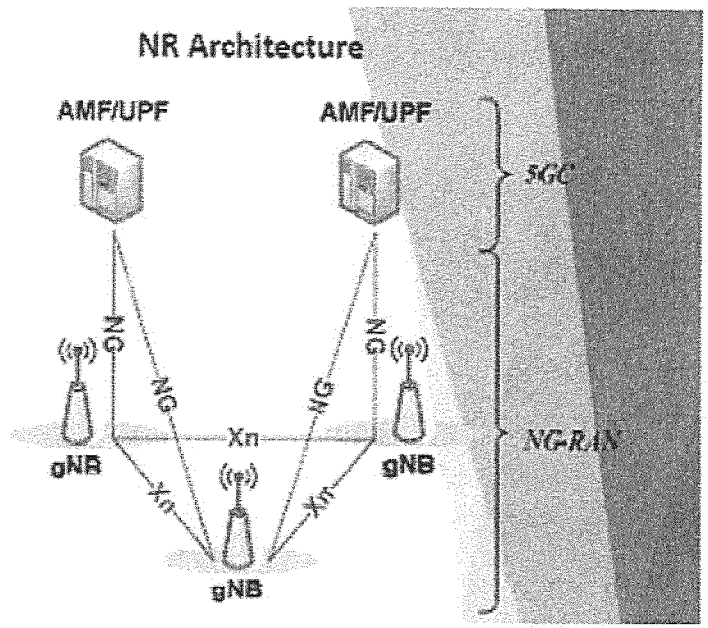
FIGS. 2 and 3 show an example of New Radio (NR) architecture having the 5G core (5GC) and the NG-RAN.
Figure 3:
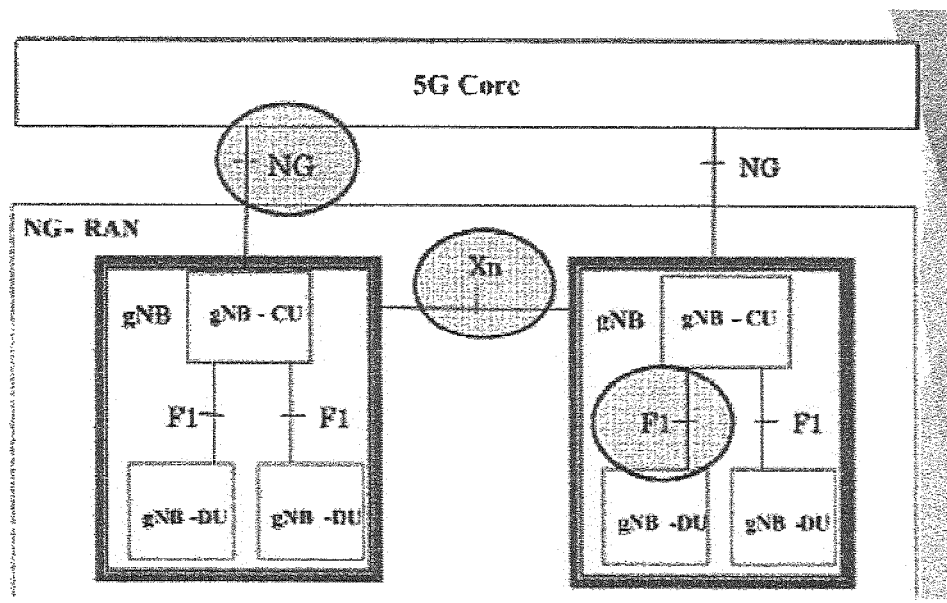

FIGS. 2 and 3 show an example of New Radio (NR) architecture having the 5G core (5GC) and the NG-RAN. The base stations gNB are coupled to the 5GC by the interface to core NGs, and the gNBs are coupled to each other by the inter-base station interface Xn.

Figure 4:
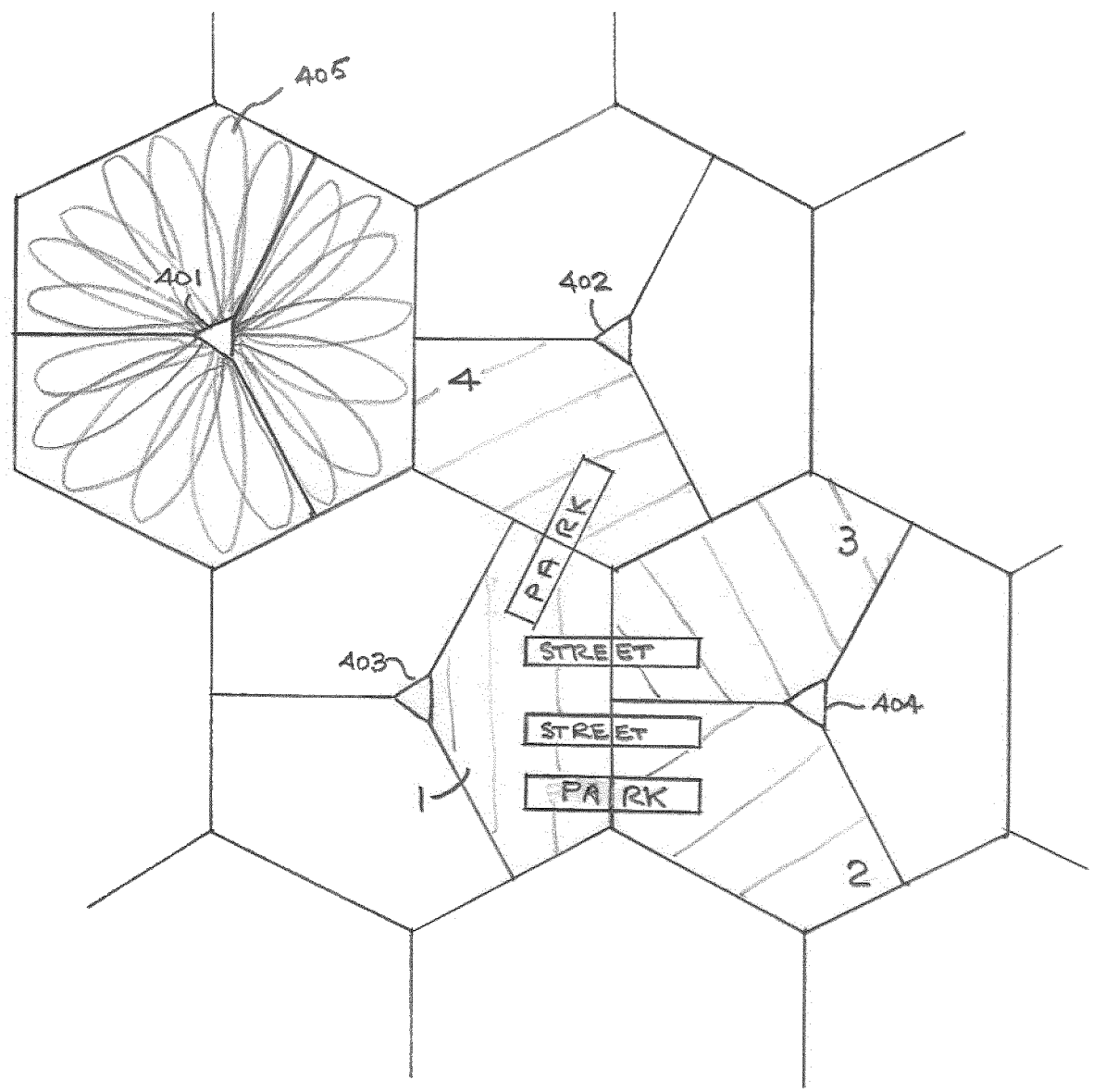
FIG. 4 shows a cellular network with several cells to illustrate the principles of the present disclosure.

In conventional networks, MRO may, for instance, optimize the cell-individual offset (CIO), which is one of the main mobility parameters controlling a handover. A serving cell configures different CIOs for different neighbors in the cell; that is, the network can control the handover separately for every cell pair. An example of this is given in FIG. 4, which shows a cellular network, including base stations 401, 402, 403, and 404, and cells 1, 2, 3, 4 represent different cell areas. Cell 1 has several neighbors, namely, cells 2, 3, and 4.

As an example, the boundary between cell 1 and cell 3 may be dominated by fast cars moving on a street. In contrast, the boundary between cell 1 and cell 4 may be dominated by a park-like area with pedestrians or even stationary users.

With conventional MRO, the network collects statistics for every cell boundary. For instance, the boundary between cell 1 and cell 3 may show failures due to "too-late" handovers caused by the fast users on the street, whereas the boundary between cell 1 and cell 4 may show "too-early" handovers or ping-pongs caused by the slow-moving pedestrians or stationary users. Using the CIO, the network can react by configuring a large CIO, such as +4 dB, on the street dominated boundary between cell 1 and cell 3, since this would upgrade the cell measurements of cell 3, thereby causing early handovers avoiding radio link failures (RLFs). Equivalently, the network configures a low CIO, such as −1 dB, in the pedestrian-dominated boundary between cell 1 and cell 4, since this would downgrade the measurements of cell 4, thereby causing late handovers to avoid ping-pongs.

Instead of, or in addition to, CIO, the network may also configure different time-to-trigger (TTT) for different neighbors. Release 12 has introduced an alternative TTT. This is configured along with a list of neighbor cell IDs, and the UE will apply the alternative TTT when the entry condition is triggered by one member of the list. The original sense was to configure shorter TTT for small cell neighbors. In principle, this can also be applied in a way similar to CIO. An alternative, shorter TTT can be configured for those neighbors with high-speed boundaries; for example, cell 1 would configure a shorter TTT, such as 50 ms instead of a default, for example, of 200 ms, for neighbor cell 3. Automatic optimization can follow the same MRO principles as described above for the CIO.

In New Radio (NR), the use of beamforming methods becomes essential, in particular due to spectrum at larger frequencies, where more severe propagation conditions have to be compensated by beamforming gain. Each of the cells in FIG. 4 includes areas covered by different beams. In the following, how beamforming could be used to improve MRO performance will be demonstrated.

Conventional MRO is a powerful method, when every cell boundary is significantly dominated by a particular UE behavior; for example, the boundary between cell 1 and cell 3 may be significantly dominated by fast-moving users, whereas the boundary between cell 1 and cell 4 may be significantly dominated by pedestrians. In contrast, the boundary between cell 1 and cell 2 may be characterized by a mix of fast-moving and slow-moving or stationary UEs, due to the presence of both a street and a park-like area, and would not have such a dominance.

Using the same set of CIOs per cell boundary, MRO can neither tune the handovers on the boundary between cell 1 and cell 2 extremely early, which would protect the handovers of the fast-moving UEs, but would create ping-pongs for the pedestrians, nor tune the handovers on the boundary between cell 1 and cell 2 extremely late to protect the slow-moving or stationary UEs.

Equivalently, when optimizing TTT, cell 1 can configure neighboring cell 2 only EITHER with the short TTT, increasing ping-pongs for the slow-moving or stationary UEs, OR with the default TTT, increasing RLFs for the fast-moving UEs.

Another target certainly is to avoid a large overhead in the network, and to guarantee that the network draws the right conclusions from failures which may be occurring.

3GPP Release 12 has introduced MRO for UE groups. This permits the use of different MRO optimizations for different UE groups. Using the example of FIG. 4 above, when cell 1 can distinguish between fast-moving and slow-moving users, the network can:
  Set up separate handover statistics for fast-moving and slow-moving UEs for the boundary between cell 1 and cell 2.
  Optimize a different CIO for this cell boundary for fast-moving and slow-moving or stationary UEs.
  Configure fast-moving and slow-moving or stationary UEs with different CIOs.

The drawback is that it is not trivial, and not at all reliable, to classify different UEs into different velocity classes. Furthermore, in many cases, the velocity is not even the crucial thing. At one location, a boundary might be dominated by a severe "round-the-corner" effect causing massive signal variations due to rapid transition from line-of-sight to non-line-of-sight. Another location of the same boundary may not suffer this problem, although the velocity may be the same.

A much more elegant solution would be to perform a beam-specific optimization. For example, a street on the boundary between cell 1 and cell 2 may be covered by one beam, and the park-like pedestrian area may be covered by another beam. This seems to be a much more natural grouping than the velocity. Hence, the network may:
  Set up beam-specific handover statistics.
  Optimize different CIO for different beam pairs.
  Configure different CIOs depending on the beams in which a UE is moving.

For the sake of clarity, and in order not to clutter cells 1, 2, 3, 4, several beams 405 are depicted in the cells operated by base station 401, although it should be understood that similar beams would be present in the cells operated by base stations 402, 403, 404, including cells 1, 2, 3, 4.

However, in NR, it does not seem to be practical to reconfigure the UE with a new CIO every time the UE switches to a new beam:
  The beams are switched by "beam management" which is a medium access control (MAC) procedure. The UE is instructed to use a different beam via the physical downlink control channel (PDCCH) or MAC Control Element (MAC CE). Moreover, the UE may recover to a new serving beam by means of a random-access channel (RACH) in case of beam failure recovery occurring after a beam failure.
  The CIO is configured on a radio resource control (RRC) level, since handovers have to involve the RRC by definition. CIOs are part of the measurement reporting configuration which has a lot of overhead, and is sent via the physical downlink shared channel (PDSCH).
  As the serving beam is changed by MAC layer procedures and the CIO parameters are provided in the RRC measurement reporting configuration, it can happen that the UE has switched to a new serving beam, without receiving its corresponding CIO from the serving cell due to delay in receiving and decoding of the RRC configuration containing the new/updated measurement reporting configuration. Herein, the UE would be using the CIO corresponding to the old serving beam though it has switched to a new beam which can cause an out-of-sync for some time between UE and network. In other words, a race condition can occur since the RRC reconfiguration and the MAC command for beam switching are not decoded at the same time.

As previously noted above, the present disclosure relates to mobility robustness optimization (MRO), and more specifically to a cell individual offset (CIO) adjustment for beamformed transmission. Current RRC signaling provides a way for configuring specific CIOs for neighboring cells in order to avoid "too-late" or "too-early" handovers. These offsets are used for checking whether a handover condition is fulfilled for a particular neighboring cell.

With beamforming, these offsets can be further adjusted based on which beam is serving the UE in the serving cell. Such a beam may be referred to as a serving beam. For instance, a beam serving a pedestrian area, such as a park, will be configured with a different handover offset than a beam serving a high-speed traffic lane. Yet, beam switching takes place at L1 (MAC CE signaling), whereas mobility management takes place at L3 (RRC signaling), which might cause some synchronization issues whenever the active beam is changed in the serving cell and appropriate RRC reconfiguration did not yet take place.

It is then proposed that a UE be preconfigured with beam-specific CIOs, or correction factors, for one or more candidate beams in a serving cell and for a given neighboring cell. These beam-specific CIOs will be autonomously applied by the UE when the active beam is changed so as to check whether a handover condition is fulfilled for the corresponding neighboring cell. In this way, the RRC signaling load is substantially reduced, and any mismatch between L1 and L3 signaling is avoided.

In the present disclosure, it is proposed that:
using the conventional RRC reconfiguration,
the network provides a list of beam-specific mobility parameters to the UE,
along with the beam IDs that the beam-specific mobility parameters are to be used;
the UE autonomously selects the beam-specific mobility parameter corresponding:
1. to the beam that the UE has been instructed to use by beam management via PDCCH or MAC CE; or
2. to the beam that the UE decides to recover to by means of RACH when performing beam failure recovery.

The most relevant mobility parameter is the cell individual offset (CIO). Other possibilities are time-to-trigger (TTT), or parameters related to Radio Link Monitoring, such as T310.

Exemplary embodiments of the present disclosure will now be discussed in further detail.

As explained above, the most relevant application of this idea is the cell individual offset. Hence, we will explain the details of the present disclosure with the help of the CIO; other examples (TTT and RLF-related parameters) would follow the same principles.

We will use the example of the A3 measurement reporting event in LTE. This has the entry condition:

$$Mn+Ofn+Ocn-Hys>Mp+Ofp+Ocp+Off$$

where Mn and Mp are the measurements of the neighboring cell and of the serving (primary) cell, Ocn is the cell individual offsets, and the other parameters Ofn, Ofp, Ocp, Off and Hys are other offset and hysteresis parameters.

At present, Ocn can be configured for a neighbor, and may have a non-zero value. If Ocn is not configured, the UE will assume that Ocn=0 dB. Note again that different Ocn can be configured for different neighbors n, and that the identification is done by providing the cell ID of cell n along with the Ocn.

In the present disclosure, this concept is extended to beams. If the UE uses different CIOs for different beams, it may provide additional IDs for the same neighbor n, but with different beam IDs.

Using the original example again, the following tables below illustrate how such a configuration might look. At present—see Table 1, prior art, and referring again to FIG. 4—cell 1 would configure its UEs, as an example, with three CIOs: +4 dB, forcing early handovers, for neighboring cell 3; −1 dB, forcing late handovers, for neighboring cell 4; and a trade-off of +1 dB, forcing a slightly earlier handover, for neighboring cell 2 with mixed velocities. All other boundaries would use CIO=0 dB.

TABLE 1

| Target Cell ID | CIO |
|---|---|
| Neighbor cell 3 | +4 dB |
| Neighbor cell 4 | −1 dB |
| Neighbor cell 2 | +1 dB |

Ocn in the prior art

According to the present disclosure, the network may configure multiple CIOs for the same boundary with cell 2, and specify a beam ID. Beam 17 (an example designation not shown in FIG. 4), directed where a street is located, is configured with +4 dB for early handover; all other beams in cell 2 will use −1 dB for late handover.

TABLE 2

| Target Cell ID | Source Beam ID | CIO |
|---|---|---|
| Neighbor cell 3 | | +4 dB |
| Neighbor cell 4 | | −1 dB |
| Neighbor cell 2 | Beam 17 | +4 dB |
| Neighbor cell 2 | | −1 dB |

Ocn according to the present disclosure

When the UE is configured with beam 17 in cell 1 via beam management on the MAC level, it will select Ocn=+4 dB for measurements of cell 2 when evaluating the entry condition of the measurement reporting event. If the UE is instructed to change the beam to one other than beam 17 via beam management on MAC level, by PDCCH or MAC CE, it will continue evaluating the entry condition, replacing the Ocn by Ocn=−1 dB for neighbor cell 2.

In one embodiment, the beam ID corresponds to the index of the Synchronization Signal Block (SSB) or Channel State Information Reference Signal (CSI-RS) that is quasi co-located with a De-Modulation Reference Signal (DMRS) of a Physical Downlink Control Channel (PDCCH) and/or a Physical Downlink Shared Channel (PDSCH) used for communication with the UE.

In one embodiment, the UE continues the evaluation of the handover condition with the new Ocn value. If the handover condition is still fulfilled with the new Ocn value, then the time-to-trigger (TTT) timer keeps on running without being reset, else the TTT timer is stopped.

In another embodiment, when the UE is served by multiple source beams from different transmission and reception points (TRPs), the UE applies the CIO of the beam on which it has received the last PDCCH and/or PDSCH, or the CIO of the beam on which it receives PDCCH, when PDCCH is provided on a single beam.

In another embodiment, the CIO can be configured for a specific beam in a source cell, such as beam 17 mentioned above, and with respect to a specific beam or group of beams in a target neighbor cell, which is/are being measured for evaluation of a handover condition. That is, the CIO is specified for a "source beam, neighbor beam" pair.

In such a case, Table 2 above will then have an additional column with the heading "Target beam ID" for the beam ID in the target cell.

In another embodiment, the mobility parameter is TTT. When the beam is switched, and the UE switches from TTT1 to TTT2 while TTT1 has been running for a certain time $TTT_{part}<TTT1$, the UE may behave as follows:
If $TTT_{part}>TTT2$: UE should behave as if TTT has expired, that is, by sending a measurement report;
If $TTT_{part}<TTT2$: UE continues TTT and replaces TTT1 by TTT2.

The advantages of the subject matter disclosed herein include:
Significantly reduced signaling overhead as the measurement configuration containing the mobility parameters, such as CIO, is provided once and the UE autonomously updates the CIO based on the serving beam.
Simple specification, since the paradigm of the existing CIO is followed.
The CIO is updated quickly by the UE as soon as the serving beam is changed without waiting for a new and updated RRC measurement configuration to be received from the network.

The network and the UE are always in-sync about the beam-specific CIO that is in use, that is, there is no race condition.

Figure 5:
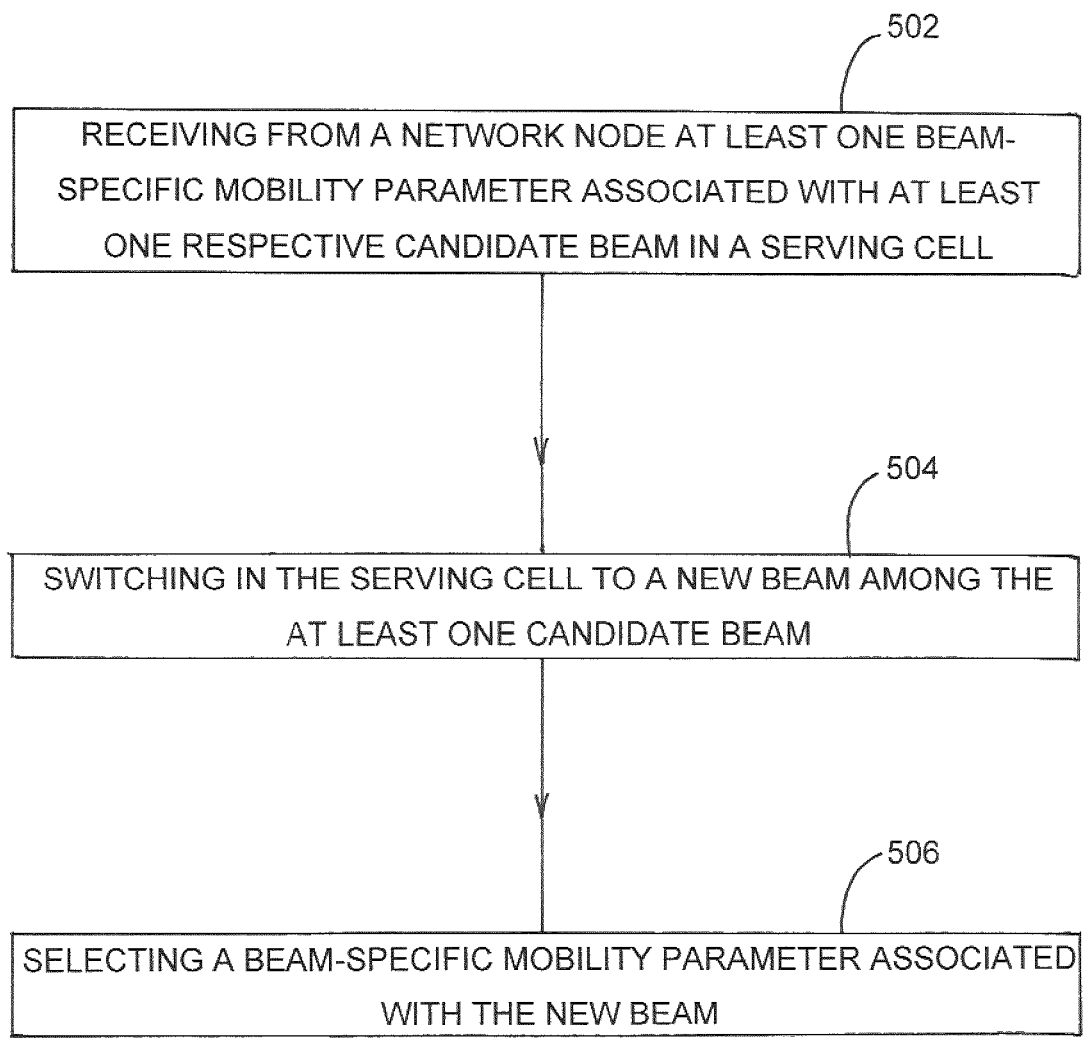
FIG. 5 is a flow chart illustrating a method performed by a user equipment in accordance with the present disclosure.

FIG. 5 is a flow chart illustrating a method performed by a user equipment in accordance with the present disclosure. In block 502, the user equipment receives from a network node at least one beam-specific mobility parameter associated with at least one respective candidate beam in a serving cell. In block 504, the user equipment switches in the serving cell to a new beam among the at least one candidate beam. Finally, in block 506, the user equipment selects a beam-specific mobility parameter associated with the new beam.

Figure 6:
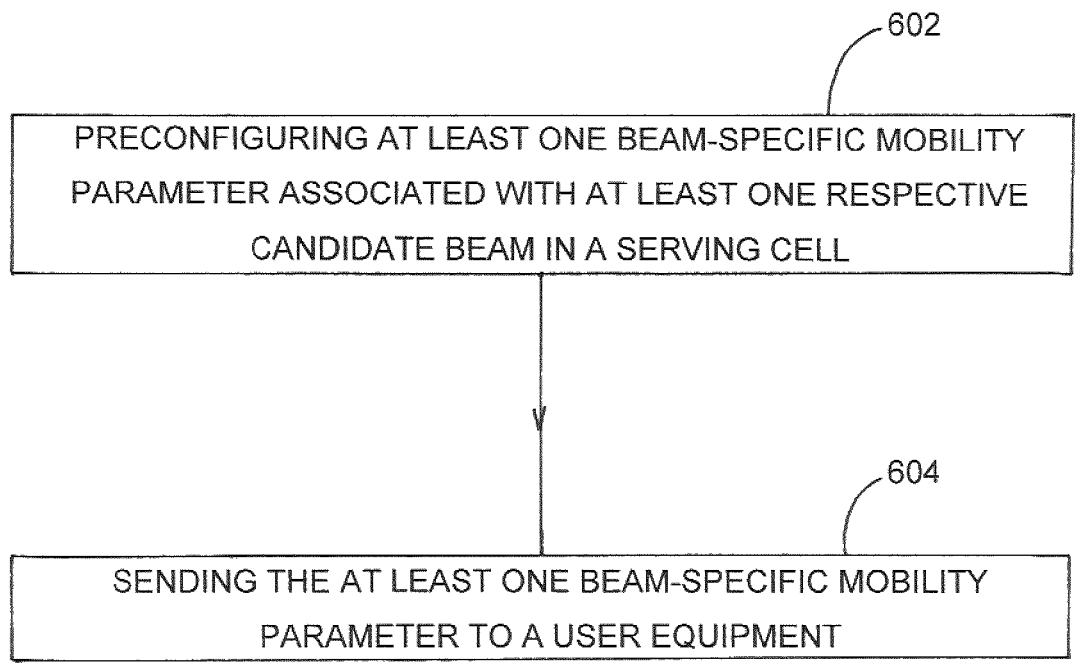
FIG. 6 is a flow chart illustrating a method performed by a base station in accordance with the present disclosure.

FIG. 6 is a flow chart illustrating a method performed by a network node in accordance with the present disclosure. In block 602, the network node preconfigures at least one beam-specific mobility parameter associated with at least one respective candidate beam in a serving cell. And, in block 604, the network node sends the at least one beam-specific mobility parameter to a user equipment, In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the exemplary embodiments are not limited thereto.

While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the disclosure may be practiced in various components, such as integrated circuit chips and modules, and that the exemplary embodiments of this disclosure may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this disclosure.

Various modifications and adaptations to the foregoing exemplary embodiments of this disclosure may become apparent to those skilled in the relevant arts in view of the foregoing description, when read in conjunction with the accompanying drawings. For example, while the exemplary embodiments have been described above in the context of advancements to the 5G NR system, it should be appreciated that the exemplary embodiments of this disclosure are not limited for use with only this one particular type of wireless communication system. The exemplary embodiments of the disclosure presented herein are explanatory and not exhaustive or otherwise limiting of the scope of the exemplary embodiments.

The following abbreviations may have been used in the preceding discussion:
CE Control Element
CIO Cell Individual Offset
CSI Channel State Information
CSI-RS CSI Reference Signal
DL Downlink
eNB eNodeB (4G Base Station)
GHz Gigahertz
gNB gNodeB (5G Base Station)
HO Handover
ID Identifier
LTE Long Term Evolution
MAC Medium Access Control
MAC CE MAC Control Element
MRO Mobility Robustness Optimization
NR New Radio (5G)
Ocn Neighbor Cell Offset (3GPP symbol for CIO)
PDCCH Physical Downlink Control Channel
PDSCH Physical Downlink Shared Channel
QCL Quasi Co-located
RACH Random Access Channel
RF Radio Frequency
RLF Radio Link Failure
RLM Radio Link Monitoring
RP Reception Point
RRC Radio Resource Control
RS Reference Signal
Rx Receiver
SSB Synchronization Signal Block
TRP Transmission and Reception Point
TTT Time-to-Trigger
Tx Transmitter
UE User Equipment
UL Uplink
3GPP $3^{rd}$ Generation Partnership Project
5G $5^{th}$ Generation The terminology used herein is for the purpose of describing particular embodiments only and is not intended to be limiting of the disclosed embodiments. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present exemplary embodiments has been presented for purposes of illustration and description, but is not intended to be exhaustive or limited to the embodiments in the form disclosed. Many modifications and variations will be apparent to those of ordinary skill in the art without departing from the scope and spirit of the present disclosure. The embodiments were chosen and described in order to best explain the principles of the disclosure and the practical application, and to enable others of ordinary skill in the art to understand the disclosure for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments thereof.

Although described in the context of particular embodiments, it will be apparent to those skilled in the art that a number of modifications and various changes to these teachings may occur. Thus, while the examples have been particularly shown and described with respect to one or more disclosed embodiments, it will be understood by those skilled in the art that certain modifications or changes may be made therein without departing from the scope of the disclosure as set forth above, or from the scope of the claims to follow.

What is claimed is:

1. A user equipment comprising:
at least one processor; and
at least one non-transitory memory including computer program code,
the at least one memory and the computer program code being configured, with the at least one processor, to cause the user equipment to perform:
receive from a network node at least one cell individual offset associated with at least one respective candidate beam in a serving cell;
switch in the serving cell to a new beam among the at least one candidate beam;
select a cell individual offset associated with the new beam; and
when served by multiple source beams from different transmission and reception points, apply a cell individual offset of a beam providing a physical downlink control channel, when the physical downlink control channel is provided on a single beam,
wherein the new beam is a beam autonomously decided for use when performing beam failure recovery in the serving cell,
wherein the at least one cell individual offset is further associated with candidate neighbor beams in a neighbor cell, and wherein the selected cell individual offset further corresponds to a candidate neighbor beam in the neighbor cell,
wherein a beam identifier corresponds to:
an index of a Channel State Information Reference Signal (CSI-RS), the CSI-RS being quasi co-located with a De-Modulation Reference Signal (DMRS) of a physical downlink control channel and a physical downlink shared channel used by the user equipment for communication,
wherein the at least one memory and the computer program code are further configured, with the at least one processor, to cause the user equipment to:
continue an evaluation of a handover condition with a new cell individual offset without resetting a time-to-trigger timer, in case the time-to-trigger timer of a measurement reporting event is running.

2. The user equipment as claimed in claim 1, wherein a measurement reporting event has an entry condition comprising:

$$Mn+Ofn+Ocn-Hys>Mp+Ofp+Ocp+Off$$

where Mn is a measurement of the neighbor cell, Mp is a measurement of the serving (primary) cell, Ocn is the cell individual offsets, and the other parameters Ofn, Ofp, Ocp, Off and Hys are other offset and hysteresis parameters,
wherein if Ocn is configured for a neighbor it has a non-zero value and if Ocn is not configured then Ocn=0 dB,
wherein when the user equipment uses different cell individual offsets for different beams, then the user equipment provides additional cell identifies for the same neighbor n, but with different beam identities.

3. A method comprising:
receiving from a network node at least one cell individual offset associated with at least one respective candidate beam in a serving cell;
switching in the serving cell to a new beam among the at least one candidate beam; and
selecting a cell individual offset associated with the new beam; and
when served by multiple source beams from different transmission and reception points, apply a cell individual offset of a beam providing a physical downlink control channel, when the physical downlink control channel is provided on a single beam,
wherein the new beam is a beam autonomously decided for use when performing beam failure recovery in the serving cell,
wherein the at least one cell individual offset is further associated with candidate neighbor beams in a neighbor cell, and wherein the selected cell individual offset further corresponds to a candidate neighbor beam in the neighbor cell,
wherein a beam identifier corresponds to:
an index of a Channel State Information Reference Signal (CSI-RS), the CSI-RS being quasi co-located with a De-Modulation Reference Signal (DMRS) of a physical downlink control channel and a physical downlink shared channel used by the apparatus for communication,
wherein the method further comprises:
continuing an evaluation of a handover condition with a new cell individual offset without resetting a time-to-trigger timer, in case the time-to-trigger timer of a measurement reporting event is running.

4. An apparatus comprising:
circuitry configured to receive from a network node at least one cell individual offset associated with at least one respective candidate beam in a serving cell;
circuitry configured to switch in the serving cell to a new beam among the at least one candidate beam;
circuitry configured to select a cell individual offset associated with the new beam; and
when served by multiple source beams from different transmission and reception points, circuitry configured to apply a cell individual offset of a beam providing a physical downlink control channel, when the physical downlink control channel is provided on a single beam,
wherein the new beam is a beam autonomously decided for use when performing beam failure recovery in the serving cell,
wherein the at least one cell individual offset is further associated with candidate neighbor beams in a neighbor cell, and wherein the selected cell individual offset further corresponds to a candidate neighbor beam in the neighbor cell,
wherein a beam identifier corresponds to:
an index of a Channel State Information Reference Signal (CSI-RS), the CSI-RS being quasi co-located with a De-Modulation Reference Signal (DMRS) of a physical downlink control channel and a physical downlink shared channel used by the apparatus for communication,
wherein the circuitry is further configured to:
continue an evaluation of a handover condition with a new cell individual offset without resetting a time-to-trigger timer, in case the time-to-trigger timer of a measurement reporting event is running.

5. A computer program product comprising a non-transitory computer-readable storage medium bearing computer program code embodied therein for use with a computer, the computer program code comprising code for performing:

receiving from a network node at least one beam-specific mobility parameter associated with at least one respective candidate beam in a serving cell;

switching in the serving cell to a new beam from the at least one candidate beam; and selecting a beam-specific mobility parameter associated with the new beam; and when served by multiple source beams from different transmission and reception points, applying a cell individual offset of a beam providing a physical downlink control channel, when the physical downlink control channel is provided on a single beam, wherein the new beam is a beam autonomously decided for use when performing beam failure recovery in the serving cell, wherein the at least one cell individual offset is further associated with candidate neighbor beams in a neighbor cell, and wherein the selected cell individual offset further corresponds to a candidate neighbor beam in the neighbor cell, wherein a beam identifier corresponds to:

an index of a Channel State Information Reference Signal (CSI-RS), the CSI-RS being quasi co-located with a De-Modulation Reference Signal (DMRS) of a physical downlink control channel and a physical downlink shared channel used by the apparatus for communication, wherein the computer program code further comprises code for performing:

continuing an evaluation of a handover condition with a new cell individual offset without resetting a time-to-trigger timer, in case the time-to-trigger timer of a measurement reporting event is running.

* * * * *